United States Patent [19]

Thompson et al.

[11] 3,725,580

[45] Apr. 3, 1973

[54] PROTECTIVE CABLE SPLICE ASSEMBLY AND METHOD

[76] Inventors: John T. Thompson, 244 Loring St., Los Angeles, 90024; George W. Gillemot, 2331 20th St., Santa Monica, both of Calif. 90405

[22] Filed: Sept. 10, 1970

[21] Appl. No.: 71,149

Related U.S. Application Data

[63] Continuation-in-part of Ser. No. 843,508, July 22, 1969, abandoned.

[52] U.S. Cl. .........................174/38, 29/628, 174/10, 174/76, 174/78, 174/87, 174/91
[51] Int. Cl. ..........................H02g 9/02, H02g 15/04
[58] Field of Search .........174/10, 12 R, 17 R, 17.05, 174/21 R, 22 R, 23 R, 37, 38, 51, 60, 72 R, 76, 77 R, 78, 87, 88 R, 91, 93; 29/592, 628

[56] References Cited

UNITED STATES PATENTS

| | | | |
|---|---|---|---|
| 2,977,456 | 3/1961 | Stiebel | 174/93 UX |
| 3,209,069 | 9/1965 | Ruddell et al. | 174/91 X |
| 3,254,153 | 5/1966 | Kohler | 174/93 |
| 3,518,358 | 6/1970 | Brown | 174/93 X |
| 3,518,600 | 6/1970 | Urani | 174/91 UX |
| 3,557,299 | 1/1971 | Dienes | 174/38 |
| 785,712 | 3/1905 | Chisholm | 174/87 |
| 900,382 | 10/1908 | Joynes | 174/87 X |
| 3,364,299 | 1/1968 | Hamilton | 174/38 X |
| 3,435,124 | 3/1969 | Channell | 174/38 |

*Primary Examiner*—Laramie E. Askin
*Attorney*—Sellers & Brace

[57] ABSTRACT

A protective cable splice assembly kit and method for use in making cable splice connections with provision for access, testing, inspecting and adding other splice connections at a later time. The assembly includes a tubular housing member adapted to seat about the legs of a loop formed in a main cable and to be clamped to a cup-shaped cap member telescoped over the return bend of the loop. One or more service cables can be assembled through the tubular housing and hermetically sealed to the latter along with the legs of the main cable by potting compound applied after grounding strips have been connected to the shielding sheaths of the main cable and of the service cables. Preferably the connections to all cable sheaths are hermetically sealed within potting compound. These strips include holes for attaching testing instruments as well as grounding wires to the electrical shields of branchout service cables. The flexible cap member flexes readily to compensate for pressure differential across the junction between the two housing members. The outer end of the service cables are hermetically sealed until needed to complete a service connection and are stored along with the splice enclosure in a subsurface casing having its normally closed top flush with ground level.

51 Claims, 13 Drawing Figures

PATENTED APR 3 1973 3,725,580
SHEET 1 OF 3
FIG. 1.
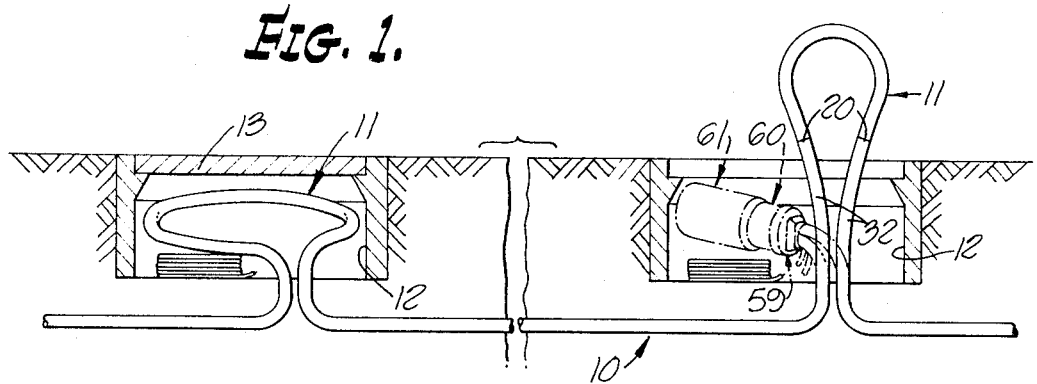
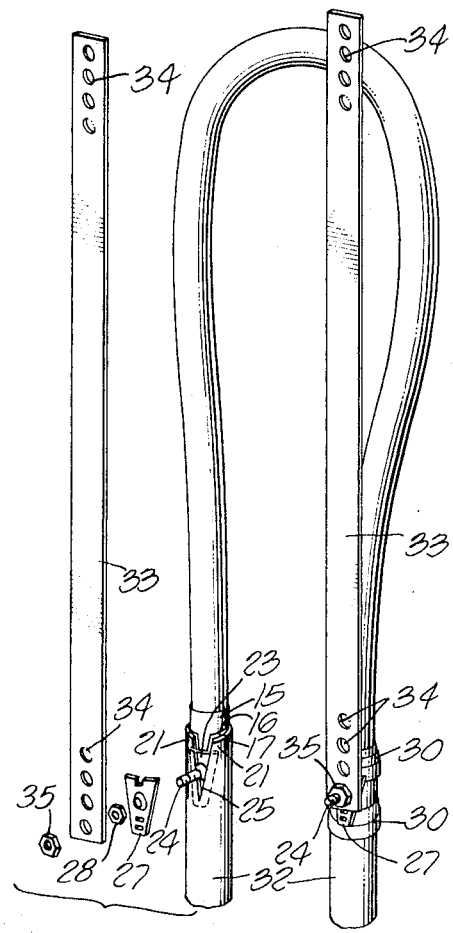
FIG. 2.
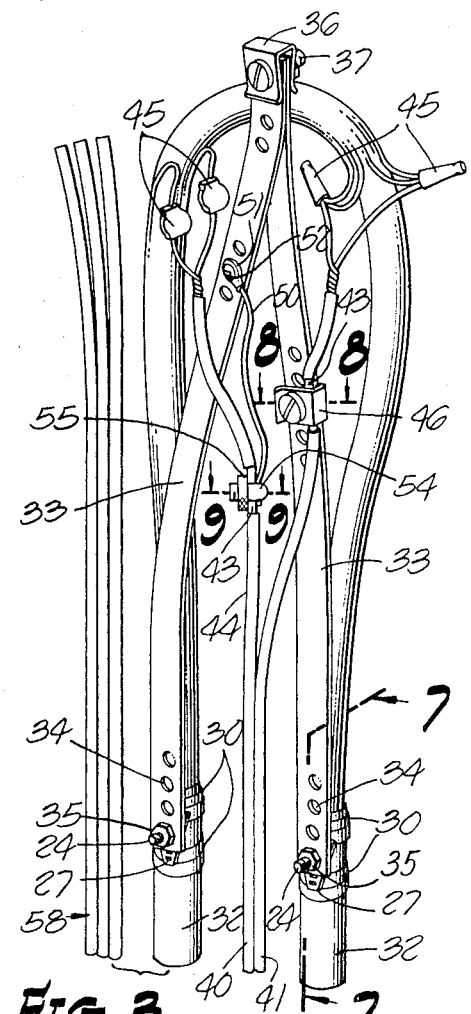
FIG. 3.
INVENTORS.
JOHN T. THOMPSON
GEORGE W. GILLEMOT
BY
ATTORNEYS

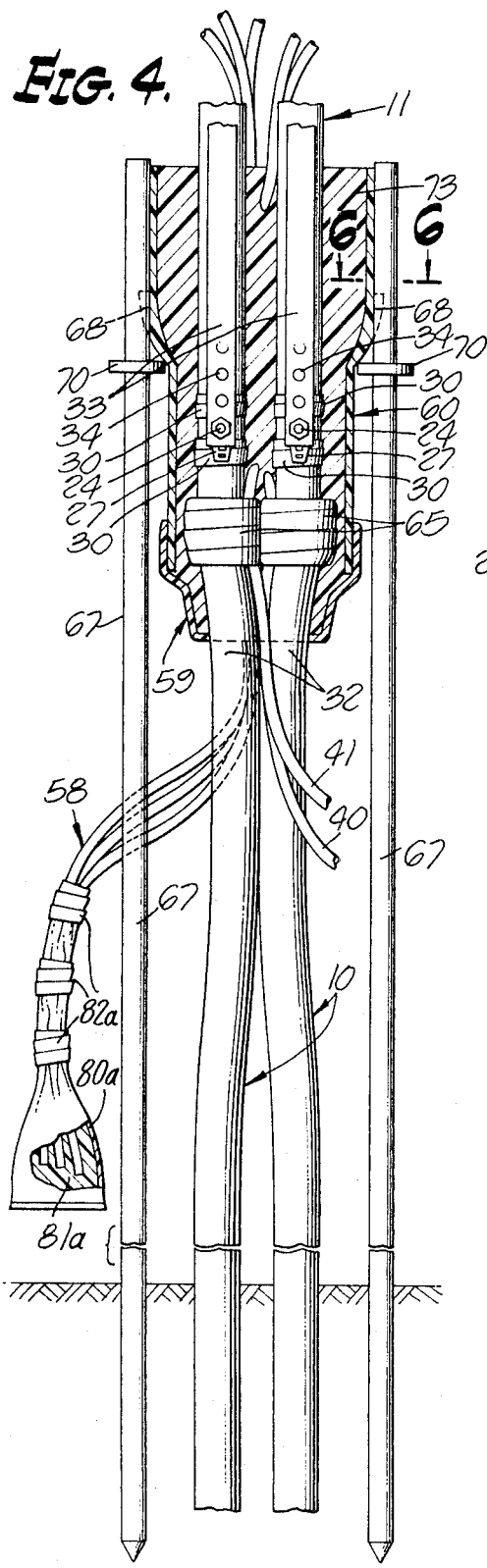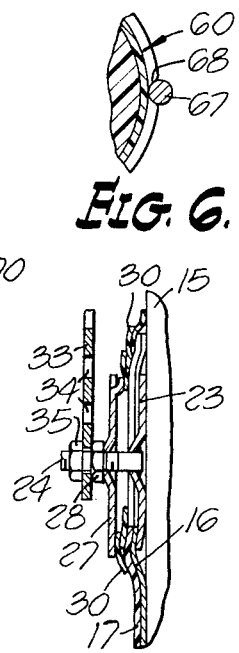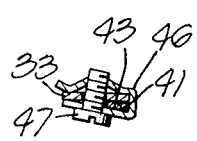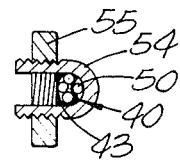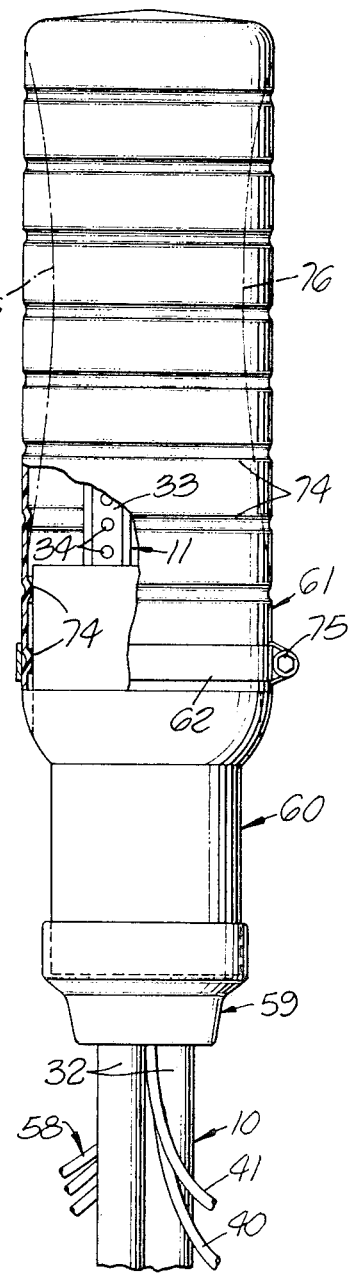

PATENTED APR 3 1973
3,725,580
SHEET 3 OF 3
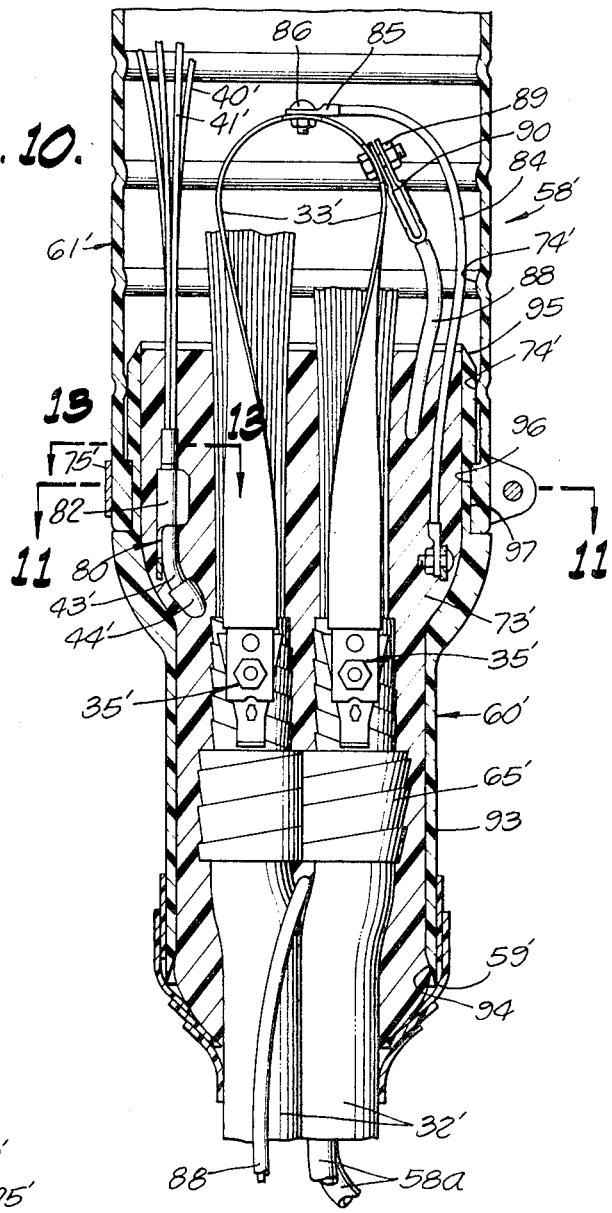
FIG. 10.
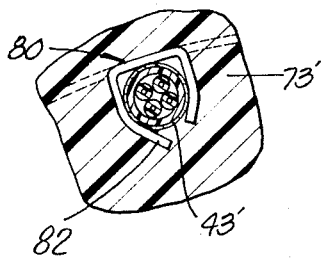
FIG. 13.
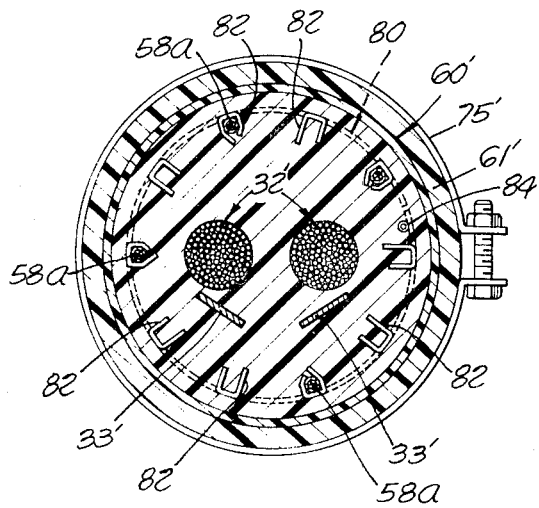
FIG. 11.
FIG. 12.
INVENTORS.
JOHN T. THOMPSON
GEORGE W. GILLEMOT
BY
ATTORNEYS

PROTECTIVE CABLE SPLICE ASSEMBLY AND METHOD

This application is a continuation in part of our copending application for U.S. Letters Pat. Ser. No. 843,508, filed July 22, 1969 and having the same title as this application, and now abandoned.

This invention relates to the construction and protection of electrical connections between main cables and branchout service cables and more particularly to a cable splice enclosure assembly and method particularly suitable for use with underground communication cables serving various subscribers.

The installation and use of sub-surface communication cable systems is accompanied by serious problems associated with the installation, protection, maintenance, servicing and expansion to meet the needs of the same or additional subscribers. Initial installation costs in new tract areas are small compared to costs in later years if there is need for additional lines. It is therefore desirable to install a main cable having adequate capacity for anticipated future needs. However, adoption of this procedure necessitates the provision of effective inexpensive and reliable means for gaining access to the main cable both for routine tests and for completion of new connections. Not infrequently, the estimated population density for a given area is revised upwardly over the years with the result that greatly expanded communication channels are needed. It is therefore desirable that adequate provision be made when initially laying the underground cable to provide for these possible exigencies.

To meet these and numerous other needs, there is provided by this invention a highly reliable, inexpensive, simple, splice connection facility and method. An original cable of fully adequate size is installed underground leaving loops of excess cabling located in suitable access wells at appropriate points along the route to be serviced. Each loop is enclosed in a two-part normally-closed but readily separable housing together with a fully adequate number of local branchout service cables, each containing a single or a double pair of conductors fully shielded in the same manner as the main cable. The return bend portion of the loop is unsheathed and equipped with a pair of perforated conductor strips each having one end anchored to the cable sheath and to the electrical shield at either end of the unsheathed portion of the loop. Preferably, the shielding sheaths of the branchout service cable are exposed and electrically interconnected at a level below the potting compound in order that the latter will hermetically seal the inner ends of the service cables and safeguard against any possibility of moisture leakage into the interior of the splice assembly. At least one service cable is spliced to selected conductors of the main cable and the service cable shield is electrically connected to the main cable ground strips. The tubular end of the two part enclosure is then telescoped over the return bend and filled with potting compound thereby hermetically sealing and anchoring the legs of the loop permanently within the base housing along with the mid portion of the service branchout conductors. The remainder of the loop is then enclosed by an impervious flexible end cap which is snugly clamped to the adjacent end of the base housing. Also the ends of any unused exposed service cable ends are encapsulated and the so-processed assembly is enclosed in the sub surface storage well.

The enclosed splice may be opened for inspection and servicing at any time by removing the end cap. By opening the connection between the two grounding strips attached to the main cable shields, the shield to either side of the storage well may be isolated and checked for serviceability and the same is true respecting each individual branchout or service cable. The ready flexibility of the enclosure end cap accommodates wide changes in ambient pressure conditions since the cap walls flex inwardly or outwardly to maintain substantially uniform pressure conditions across the joint between the two halves of the enclosure.

Accordingly, it is a primary object of this invention to provide an improved method and cable splice enclosure for use between a main communication cable and points of local service branchout cables.

Another object of the invention is the provision of an improved method and apparatus for providing underground communication cable connections between a central station and individual subscribers.

Another object of the invention is the provision of a cable splice enclosure assembly useful in providing a resealable access enclosure for splices between a main cable and service branchout connections.

Another object of the invention is the provision of an improved technique useful in providing and servicing a branchout from main cable with provision for expanding the service connections utilizing a hermetically sealed splice cover for the junction.

Another object of the invention is the provision of a multiple conductor communication cable having provision at intervals therealong for branchout connections each provided with means for isolating the main cable shield between adjacent branchout facilities.

Another object of the invention is the provision of an accessible cable splice assembly between a main shielded cable and one or more shielded service cables extending into one end of a separable housing through potting compound and wherein the terminal ends of the shielding for all cables are encapsulated and hermetically sealed by the potting compound.

Another object of the invention is the provision of an accessible cable splice assembly for a shielded main cable and one or more shielded service cables wherein the adjacent inner ends of the service cable shields are electrically interconnected and hermetically sealed along with a lead wire having an exposed end separably connectable to conductive members having one end connected to a hermetically sealed junction with the main cable shields.

These and other more specific objects will appear upon reading the following specification and claims and upon considering in connection therewith the attached drawing to which they relate.

Referring now to the drawing in which preferred embodiments of the invention are illustrated.

FIG. 1 is a generally schematic view of a length of main communication cable along with two typical branchout service wells;

FIG. 2 is an enlarged view of the cable loop showing one metallic grounding strip in assembled position and a second one in exploded condition;

FIG. 3 is a view similar to FIG. 2 showing a pair of installed branchout cables and three extra branchout cables, all in readiness for hermetic assembly to a splice housing;

FIG. 4 is a fragmentary view of a main cable loop supported on a pair of rigid support rods useful while applying the potting compound;

FIG. 5 is an elevational view showing the completed splice connection with a portion of the enclosure cap broken away;

FIG. 6 is a fragmentary cross-sectional view taken along line 6—6 on FIG. 4;

FIG. 7 is an enlarged fragmentary cross-sectional view taken along line 7—7 on FIG. 3;

FIG. 8 is a cross-sectional view taken along line 8—8 on FIG. 3;

FIG. 9 is an enlarged sectional view taken along line 9—9 on FIG. 3;

FIG. 10 is a vertical sectional view of a second preferred embodiment;

FIG. 11 is a cross-sectional view taken along line 11—11 on FIG. 10;

FIG. 12 is a perspective view of a common ground connector ring for the splice end of the service cables; and FIG. 13 is a cross-sectional view on an enlarged scale taken on line 13—13 on FIG. 10.

Referring initially more particularly to FIG. 1, there is indicated a typical communication cable 10 understood as suitably buried underground in protective means not shown and having service outlet loops 11,11 conveniently located at prospective subscriber property areas. Each loop 11 is normally protected by a storage well casing 12 normally closed by cover 13 flush with the adjacent ground surface. Main cable 10 encloses a multiplicity of conductor pairs, there being at least one pair for each anticipated service outlet. Typically these conductors are enclosed by an inner plastic sheath 15 (FIG. 7), an electrically conductive shielding layer 16, and a very tough heavy duty outer sheath 17.

Preparatory to processing loop 11 to install one or more service connections, the return bend portion of the loop is unsheathed by severing the outer sheath at 20,20 and slitting the sheath lengthwise therebetween to detach it. Thereafter the underlying portion of metallic electrical shielding 16 is removed and a shorter length portion of the inner plastic sheath 15 is also detached. Three closely spaced parallel slits 25 are then made lengthwise of the cable through outer sheath 17 and shielding layer 16. These three slits form a pair of long tongues 21,21 to either side of the center slit in manner best shown in FIG. 2, permitting the pointed end of the triangular-shaped transversely curved head 23 of bolt 24 to be inserted lengthwise of slit 25 in the manner best shown in FIG. 2. Bolt head 23 is inserted between the inner plastic sheath 15 and the adjacent surface of metal shield 16. After head 23 has been inserted until bolt shank 24 is firmly seated near the inner end of slit 25 a triangular shaped metal clamping washer 27 is inserted over bolt shank 24 and nut 28 is tightened. This forces washer 27 against the exterior of outer sheath 17 and bolt head 23 against shielding layer 16 to provide an excellent electrical connection to the shield while anchoring the connection to the strong cable sheath.

Prior to assembling washer 27 to the bolt shank it is desirable to wrap the cable and the opposite ends of head 23 to either side of bolt 24 with several convolutions of adhesive tape 30,30. This tape not only serves to hold tongues 21 firmly closed against bolt head 23 but aids in preventing rotation of head 23 during tightening of nut 28. After both legs 32 of loop 11 have been similarly processed, metal strips 33, perforated with closely spaced holes 34, are assembled over the shanks of bolts 24 using the last hole at one end of each strip, and clamped in place by nut 35. Completion of the electrical path between the shields 16 in each leg of loop 11 is performed by clamping the upper ends of strip 33 together by a metal clip 36 and clamping bolt 37 (FIG. 3). At any future date if it becomes desirable for any reason to test the condition of the cable to either side of loop 11, bolt 37 is removed and the upper ends of strips 33 are separated and connected to appropriate test equipment. After the test work has been completed clip 36 and bolt 37 are restored to restore electrical continuity between the adjacent ends of shields 16.

If it is desirable to provide one or more branchout service connections from cable 10, these are prepared at this time, such as branchouts 40,41, best shown in FIG. 3. It will be understood that each of the service cables 40,41 includes at least one pair of conductors enclosed by a shielding metal sheath 43 held in place by a tough exterior sheath 44 of suitable insulation. The ends of the cable to be connected to conductors 10 have a portion of the sheath removed, and thereafter the conductors proper are connected to a selected pair of conductors from cable 10 using appropriate insulated connectors 45,45 of which two typical types are illustrated in FIG. 3. Likewise a portion of sheath 44 rearward of the connectors is removed to expose a short length of shielding 43, care being exercised to avoid damage to the shielding. This shielding is then connected to the grounding system for the cable shielding. Two modes of forming this grounding connection are shown in FIG. 3, one mode utilizing a U-shaped metal clip 46 proportioned as shown in FIG. 8 and clamped to one of the strips 33 by clamping screw 47. Service cable 40 utilizes a different grounding connection comprising a short length of wire 50 having an eyelet 51 clamped to strip 33 by a bolt 52. The other end of grounding wire 50 is clamped to sheath 43 of cable 40 by a split bolt 54 and a finger-tightened clamping nut 55.

The three-piece protective enclosure for loop 11, branchout cables 40,41, and a selected number of standby branchout cables, designated generally 58, comprises a cup-shaped lower cap member 59, a tubular member 60 and a second cup-shaped member 61 (FIG. 5), normally held detachably coupled to member 60 in a fluid tight manner by an adjustable band clamp 62. All three members 59,60,61 of the splice enclosure are preferably formed of molded thermoplastic material selected to have excellent bonding characteristics with the sealing compound used in potting the cables passing through members 59 and 60 hermetically sealed in place. As herein shown by way of example, member 60 is smaller at one end and has a snug fit with the interior sidewall of the relatively soft and resilient material of lower cap 59. After cutting an elongated slot of appropriate size in the generally rectangular bottom of cap 59, this cap is forced downwardly over loop 11, service cables 40,41 and 58 are placed against legs 32 and secured snugly thereto by wrappings of tape 65 in an area closely spaced below the ends of grounding strips 33. Member 60 is then lowered over the return bend to the position shown in FIG. 4 with its lower end telescoped into cap 59.

The assembly is now conveniently supported in an upright position utilizing stakes 67 driven into the ground and spaced to seat in diametrically opposed notches 68 formed in the exterior of housing 60 (FIG. 6). Stakes 67 may include washers 70 fixed to the stakes at a point to underlie the enlarged upper end of housing 60 and the stakes may be held firmly in notches 68 by a wrapping of tape. Potting compound 73 is then charged into housing 60 substantially to the upper end thereof and allowed to take a set. In this manner the grounding strips 33, all service cables and the main cable are firmly and permanently hermetically sealed in place lengthwise of closure member 60.

The second cup-shaped closure member 61 is molded from suitable flexible thermoplastic or the like elastomeric material and includes a plurality of inwardly extending annular ribs 74. The interior surface of ribs 74 may be rounded as illustrated in FIG. 5 and function similarly to an O-ring seal when telescoped over the upper end of tubular housing 60. Desirably there are at least two of the sealing rings 74 in contact with the sidewall of member 60 and one of these is held firmly compressed against this wall by clamping band 62 and its adjustable tightening screw 75.

Owing to the flexibility of the sidewalls of member 61, these walls readily flex inwardly or outwardly, as is indicated by the dot-dash line 76 in FIG. 5, to compensate for pressure changes between the interior and exterior of this cap. For this reason there is substantially no pressure differential between the interior and exterior of the assembly with attending lessening of opportunity for leakage past the O-ring seals 74.

Service conductors 40,41 are now extended through a suitable trench to a service outlet in a building or the like. The group of spare cables 58 provided for possible future use have their outer ends sealed against any possibility of damage or entry of moisture into the interior of the splice enclosure 60,61. This sealing may comprise a plastic sock 80a (FIG. 4) pulled over the outer ends of conductors 58 and filled with potting compound 81a. Before this compound takes a set the upper portion of tube 80a is wrapped snugly about the conductors and held in place by wrappings of tape 82a. Before applying these wrappings care is exercised to assure that any air has escaped from the potting compound and that the snugly gathered top portion of sock 80a is filled with potting compound.

As soon as the assembly has been completed in the manner described, it may be lowered into well 12, as is indicated in dotted lines in the right hand side of FIG. 1, and left for an indefinite period. If there is no need for service connections from a particular well at the time of installation, loop 11 may be left intact until such time as there is a need for a service connection, this being the condition illustrated in the left hand side of FIG. 1. However, as soon as there is need for a service connection, loop 11 is processed in the manner described to provide not only the service connection required but with standby cables 58 adequate in number for provision for all possible future service needs.

Whenever there is need for inspection, servicing, testing or the connection of an additional service cable to the main cable it is a simple matter to proceed to the appropriate one of the storage wells 12, and to support the enclosed service loop on stakes 67,67 after loosening clamp 62 and removing cap 61. The service man then proceeds to make a test or to connect in an additional one of the spare service cables 58 following which cap 61 is restored. If a spare cable is required, a selected one of the group 58 is cut away at the top of sock 80a and coupled to a length of service cable in known manner.

Although separate strips 33 have been illustrated and described as interconnecting the tubular shields of the two cable legs 32, it will be understood that a single U-shaped strip of the same material may be used. At any time it should be necessary to test the cable shield to either side of the branchout assembly, the bight portion can be severed and bolted together after testing to reestablish the grounding circuit.

Referring now to FIGS. 10–13, there is shown a second preferred embodiment of the invention differing only in minor respects from the embodiment just described and shown in FIGS. 1–9. The same or similar components of the second embodiment are designated by the same reference characters as in the first embodiment but differ therefrom by the use of a prime. For this reason it will be unnecessary to repeat much of the description given above.

A principal difference resides in the fact that the outer sheaths 44' of branchout service cables 58a, are cut away to expose the shielding sheaths 43' within the confines of encapsulating potting compound 73'. This permits the exposed shielding jackets to be interconnected to one another and to a grounding wire at a point hermetically sealed by the potting compound thereby avoiding any possibility of moisture seeping into the interior of the splice assembly housing 60',61' by migration beneath the outer sheath.

More specifically, the common grounding connection interconnecting the sheaths of service cables 58a is best shown in FIG. 12 and will be understood as comprising a ring 80 formed from ductile sheet metal of good conductivity and split at 81 (FIG. 12) to expedite its assembly about the legs of the loop of the main cable enclosed by housing 60',61'. Connector ring 80 includes a plurality of tangs 82 herein shown as of generally U-shape and each sized to readily embrace the exposed shielding sheath 43' of a selected branchout service cable. The cable shield is pressed into position between the tangs and the latter are then clinched inwardly until tightly gripping the shield sheath.

A grounding wire 84 has its lower end bolted to the ground connector ring 80, its upper end terminating in a terminal fitting 85 securable to the grounding strip 33' by bolt 86. It will be recalled that the metal connector strips 33' have their lower ends rigidly connected to clamping assemblies 35' which, in turn, are clamped to the shielding sheath of the main cable. In some cases there is no need for an external ground but in others such a ground lead is desirable. In this case a heavy duty bare or insulated grounding conductor 88 extends upwardly through the potting compound and is securable to the grounding strip 33' by bolt 89 and a solderless terminal fitting 90. An intermediate portion of the grounding conductor is embedded in and sealed to the potting compound and its lower end extends from the splice housing alongside the main cable in the manner clearly shown in FIG. 10.

Other features characterizing the construction shown in FIGS. 10-13 relate to the design of protective enclosure 58' which includes two rather than three principal members, namely, tubular member 60' and the cup-shaped cap member 61'. Each of these members differs in certain minor respects from the similar components described above. Thus, as is made clear by FIG. 10, tubular member 60' is molded from suitable semi-rigid elastomeric material and the wall thickness of its lower end 93 is substantially thinner than the major portion of the remainder thereof with the result that the thin wall cable inlet end is readily deformed into an oval cross-sectional contour to accommodate a pair of cables 32' of larger size than could otherwise be accommodated. As shown in FIG. 10, cables 32' are readily received within member 60' without need for deforming lower end 93. However, if these cables were approximately 50 percent larger in diameter, then it would be expedient to deform wall 93 into an oval shape to permit or to expedite the assembly operation for reasons apparent from the foregoing description.

Additionally, the lower end of wall 93 is tapered or bevelled as is indicated at 94, the bevel being frustoconical and flaring outwardly and downwardly as viewed in FIG. 10 to a sharp edge. This flare serves as a pilot to facilitate the assembly of the cables into the housing and additionally provides a flexible feathered edge which deforms readily into sealing contact with the tape wrapping 59' as the latter is applied prior to charging the cavity with sealing compound 73'.

The upper end of member 60' is likewise provided with a bevelled edge 95 similar to bevel 94 but flaring upwardly and inwardly, as is clearly indicated. The principal purpose of this flare is to provide a pilot facilitating expanding of the open end of cap member 61' during the assembly of this cap to tube 60'.

Still another difference in the design is the provision of an inwardly projecting radial locking flange 96 integral with the lower rim edge of cap member 61'. This locking flange 96 seats in a shallow complementally shaped groove 97 formed in the outer surface of the upper end of member 60'.

Desirably the inner surface of the lowermost bead or rib 74' formed in the wall of cap member 61' has a snug interfering fit with the juxtaposed side wall of member 60'. Likewise, flange 96 preferably has a snug tension fit when seated in groove 97. It follows from the foregoing that, when the parts are assembled in the position shown in FIG. 10, the two housing members 60', 61' are snugly sealed and locked in assembled position in a fluid and vapor tight manner. Assurance against the possibility of this seal being broken or the parts becoming accidentally separated is provided by assembling clamp 75' about the lower end of cap member 61' and tightening its clamping bolt.

It will therefore be appreciated from the foregoing that the second embodiment has the same features and capabilities as the first described embodiment and that the shields for each leg of the main cable as well as the individual service cables can be individually and separately tested by removing caps 61' and loosening bolts 86 and 89. In this connection it will be understood that each of the strips 33' may be separably interconnected, as by the bolt and clip 36,37 shown in FIG. 3.

While the particular protective cable splice assembly and method herein shown and disclosed in detail is fully capable of attaining the objects and providing the advantages hereinbefore stated, it is to be understood that it is merely illustrative of the present preferred embodiments of the invention.

We claim:

1. That method of installing a communication line which comprises making an underground installation of a moisture proof main cable enclosing multiple conductor pairs therein within a continuous conductive electrical shielding jacket, leaving a loop of excess cable at intervals therealong each conveniently located to prospective customer property areas, removing the sheath from a return bend portion of at least one of said loops, coupling at least one pair of service conductors to a pair of cable conductors, providing a fluid-tight enclosure for said cable loop including a readily removable deep cup-shaped protective enclosure normally closed in a fluid-tight manner about the coupling between said service conductors and said main cable, hermetically sealing one end portion of said protective enclosure about the exterior of said service conductors and said main cable with potting compound while leaving the return bend portion of the main cable and the adjacent interior end of said service conductors accessible for testing and checking when said cup-shaped portion of said separable protective enclosure is withdrawn from a snug-fitting telescopic assembly with said hermetically sealed end portion of the protective enclosure, and including provision in the completed assembly for compensation for pressure changes due to changes in atmospheric conditions.

2. That method defined in claim 1 characterized in the step of utilizing a pair of tube-like members for said protective enclosure and shaped to telescope together over the return bend portion of one said loop.

3. That method defined in claim 1 characterized in the step of utilizing resilient flexible material for said deep cup-shaped portion of the enclosure and which material flexes readily to compensate for changes in pressure occurring between the interior and exterior of said protective enclosure thereby to maintain the pressure differential across the wall of said protective enclosure generally constant despite changes in the ambient temperature and pressure.

4. That method defined in claim 1 characterized in the step of utilizing a protective enclosure having a pressure responsive flexible wall which flexes in response to the changes in pressure acting on the opposite surfaces thereof.

5. That method defined in claim 4 characterized in the step of making the cup-shaped portion of said protective enclosure of impervious flexible resilient elastomeric material.

6. That method defined in claim 1 characterized in the step of anchoring one end of separate metallic strips in electrical contact with an electrical shielding sheath embracing the respective legs of said cable loop prior to hermetically sealing these portions of the loop legs in said potting compound thereby to embed said one end of said metallic strips in said potting compound.

7. That method defined in claim 6 characterized in the step of providing a readily separable and reclosable conductive path between the shielding sheaths of said service conductors and said metallic strips.

8. That method defined in claim 7 characterized in the step of providing means for separably interconnecting said metallic strips between areas thereof located outside said potting compound.

9. That method defined in claim 7 characterized in the step of utilizing as said metal strips metal strips having a plurality of openings therealong.

10. That method defined in claim 1 characterized in the step of hermetically sealing the outer remote ends of said service conductors closed until such time as there is need for connecting the same to customer equipment.

11. That method of providing for future connections to a multiple conductor shielded main cable which comprises forming a loop at a selected point therealong, unsheathing the return bend portion of said loop, connecting electrical conductive means to the cable shield at the opposite ends of the unsheathed portion of said loop, placing a plurality of shielded service conductors against the legs of said loop with one end of each terminating adjacent the return bend of said loop, encircling the legs of said loop and the adjacent portions of said service conductors and the portions of said main cable shield connected to said conductive means with tube-like housing means, charging said housing means with potting compound to a level sealing the connections of said conductive means to said cable shield thereby to provide a fluid-tight seal between said main cable said service conductors and the connections to said cable shields and said housing means, and detachably securing a housing cap over the return bend portion of said loop and to the adjacent end of said tube-like housing in a fluid-tight manner.

12. That method defined in claim 11 characterized in the step of electrically interconnecting the electrical shield of each of said service conductors in areas embedded in said potting compound, and extending an electrical conductor from the latter connection upwardly through said potting compound for convenience in connecting the same to a common ground for the shield of said main cable and each of said service conductors.

13. That method defined in claim 12 characterized in the step of embedding a metallic ring in said potting compound generally concentrically of said tube-like housing means and having an attached grounding conductor secured thereto, and compressing tangs carried by said ring into firm anchorage with the exposed shields of said service conductors before charging said housing means with potting compound.

14. That method defined in claim 11 characterized in the steps of completing a connection of a pair of said service conductors to a selected pair of main cable conductors by detaching said housing cap to expose the unsheathed portion of said return bend and the inner ends of said service conductors, completing a grounding connection between the shield for the selected one of said service conductors and the conductive means connected to the main cable shield, connecting the inner ends of the selected conductors to a selected pair of main cable conductors, and replacing said housing cap over one end of said tube-like housing.

15. That method defined in claim 11 characterized in utilizing a metallic strip having a series of openings spaced therealong for the electrical connection between the ends of the main cable shield and formed when unsheathing the return bend portion of said main cable, and selecting specific openings in said strips as and when needed to secure electrical conductors between said strips and the shielding sheaths of said service conductors.

16. That method defined in claim 15 characterized in the step of terminating the electrical shields of said service conductors within said potting compound, and providing a common grounding connection having one end connected to the shields of all of said service conductors at points embedded in said potting compound and an exposed second end separably connectable to said metallic strip and whereby the ends of the shields for said service conductors are hermetically sealed by said potting compound.

17. A protective enclosure enclosing splice connections between one or more branchout service cables and a main cable loop, said protective enclosure comprising first and second housing members of impervious material sized for telescopic assembly between one pair of ends, said first member being an open end tube sized to enclose the side-by-side legs of a shielded cable loop projecting outwardly past one end of said tube to expedite making splices to the conductors of said one or more branchout service cables, said second member being a deep cup-shaped member assembled over said one end of said tubular housing member, means detachably securing said first and second members assembled together, and potting compound filling the space between the exterior of lengths of cable passing through said first housing member and the interior walls of the latter and hermetically sealing and anchoring said branchout service cables and the legs of said cable loop in place therein, the return bend portion of said cable loop being unsheathed, means clamping separate grounding conductors to conductive means clamping the cable shield of each leg of the cable loop to the juxtaposed portion of the cable sheath, and said clamping means for said grounding conductors and the adjacent ends of the shields on the legs of said cable loop being embedded in and sealed to said potting compound and thereby anchored against loosening.

18. A protective splice as defined in claim 17 characterized in the provision of an arcuate length of ductile metal having tang means projecting therefrom adapted to embrace and to be clinched against the exposed terminal end of the electrical shield jacket of service conductor cables in an area encapsulated in and hermetically sealed by said potting compound, and a grounding conductor having one end connected to said ductile metal, and its other end exposed beyond said potting compound and separably connectable to said grounding conductors connected to the shields of said main cable.

19. A protective splice enclosure as defined in claim 18 characterized in that said second member is molded from flexible elastomeric material responsive to changes in pressure on the opposite sides thereof.

20. A protective splice enclosure as defined in claim 17 characterized in that said second member includes a plurality of inwardly projecting ribs encircling the same and spaced apart axially thereof, and means clamping at least one of said ribs in sealing engagement with the juxtaposed end surface of said first member.

21. A protective splice enclosure as defined in claim 17 characterized in that said grounding conductors each comprise conductive strips means having a plurality of holes therealong, and means for securing said strips separably together at points remote from the connection thereof to the cable shielding.

22. A protective splice enclosure as defined in claim 17 characterized in that said first member is larger at one end than at the end thereof having a telescopic fit with said second member.

23. A protective splice enclosure as defined in claim 17 characterized in the provision of means including sealing tape plugging the space between lengths of said cables juxtaposed to the smaller end of said first member prior to filling said first member with potting compound.

24. A protective splice enclosure as defined in claim 17 characterized in that said means detachably clamping said first and second members telescoped together comprises a clamping band positioned to apply hoop pressure to said first and second members in a plane below the top surface of said potting compound.

25. A protective splice enclosure as defined in claim 17 characterized in the provision of stake means adapted to be driven into the ground, and said first housing member having means cooperable with said stake means for supporting said first housing member in an upright position.

26. That method defined in claim 11 characterized in the step of connecting one end of a metal strip to the shielding sheath on each leg of said cable loop in an area thereof embedded in said potting compound, and leaving the main body portions of said metal strips exposed beyond said potting compound for connection to one another.

27. A protective splice enclosure as defined in claim 17 characterized in that the cable receiving end portion of said first housing member is relatively thin and flexible as compared with the flexibility of the other end thereof whereby said flexible end can be flattened sufficiently to receive a pair of cable ends of larger diameter than could otherwise be inserted therethrough.

28. A protective splice enclosure as defined in claim 17 characterized in that the rim at one end of said first housing member is formed with a wide axial taper to facilitate the assembly of components to said one end.

29. A protective splice enclosure as defined in claim 28 characterized in that each end of said first housing member is formed with a wide axial taper and inclined oppositely to one another.

30. A protective splice enclosure as defined in claim 17 characterized in that said first and second members are formed with complementally shaped flange and groove means having generally radially disposed interlocking surfaces effective to hold said first and second members positively locked in telescopic assembled relation, and said second member being formed of resilient elastomeric material whereby it may be forcibly expanded to permit disassembly.

31. A protective splice enclosure as defined in claim 30 characterized in the provision of adjustable clamp means encircling said interlocked flange and groove means and effective to hold said second member against expansion and disassembly from said first member so long as said clamp means is tightened thereagainst.

32. A cable splice assembly providing a fluid tight separable enclosure for the junction between service cable means and a loop in a main communication cable, said separable enclosure including a cup-shaped base member through which the leg portions of said loop of the main cable pass, a deep cup-shaped closure cap telescoped over said cable loop and including means clamping the rim of said closure cap to the adjacent end of said base member in a fluid tight manner, said main cable and said service cable means each including an electrical shielding sheath, a plurality of elongated metallic strips including means anchoring one end of each to the shielding sheath of said main cable in an area on each leg of said loop of cable with the free ends of said strips projecting toward the return bend portion of the cable loop, means securing the free ends of said strips separably together in good electrical contact, means separably securing the shielding sheaths of said service cable means to said metallic strips, and potting compound filling a major portion of said base member to provide a seal about the adjacent leg portions of said cable loop and embedding the ends of said metallic strips clamped to the shielding sheath of said main cable.

33. A cable splice assembly as defined in claim 32 characterized in the provision of upright stake means temporarily supported in the ground and including means securing said base member thereto in an upright manner while said base member is being charged with potting compound.

34. A cable splice assembly as defined in claim 32 characterized in that said means clamping said closure cap to said base member is located in a plane below the upper surface of the potting compound whereby said clamping means is effective when tightened to clamp said separable closure members together against said potting compound.

35. A cable splice assembly as defined in claim 32 characterized in that one end of the shielding sheaths of said service cable means are electrically connected to one another in an area hermetically sealed within said potting compound, and an electrical conductor interconnecting the shielding sheaths of said service and main cable means.

36. A cable splice assembly as defined in claim 32 characterized in the provision of a strip of ductile metal having a plurality of tangs clinched about the exposed ends of the shielding sheaths of said service cable means and including conductive means extending to a point adjacent said metallic strips and separably connected thereto, and the portion of said ductile metal strip clinched to said service cable sheath means being embedded in said potting compound to thereby hermetically seal the ends of said service cable sheaths.

37. A cable splice assembly as defined in claim 36 characterized in that said ductile metal strip comprises a split metal ring housed about the legs of said main cable loop and encircling the same within said cup-shaped base member.

38. A cable splice assembly as defined in claim 32 characterized in that said cup-shaped base member is formed of flexible material readily slit crosswise of its bottom to provide an opening through which a cable loop and service cable means can be inserted with a snug fit.

39. A cable splice assembly as defined in claim 32 characterized in that said closure cap is formed with an inwardly projecting annular bead adjacent the inlet thereof sized to have a snug fit with the juxtaposed surface of said base member as it is telescoped thereover.

40. A cable splice assembly as defined in claim 39 characterized in that said closure cap includes a plurality of axially spaced apart inwardly projecting annular beads along the interior thereof.

41. A cable splice as defined in claim 40 characterized in that a plurality of said annular beads are positioned to seat against the juxtaposed surface of said base member in the assembled position thereof.

42. A cable splice assembly as defined in claim 32 characterized in that said closure cap is formed of flexible non-conductive material which flexes readily to compensate for pressure changes on the opposite sides thereof due to changing temperature and atmospheric conditions.

43. A cable splice assembly as defined in claim 32 characterized in that said closure cap is formed of flexible non-conductive material, said closure cap having a plurality of spaced-apart corrugations formed in the wall thereof.

44. A cable splice assembly as defined in claim 32 characterized in that said closure cap is formed with a plurality of annular trough-like corrugations encircling the same at spaced apart intervals serving to strengthen the wall and effective to facilitate manually gripping the surface thereof during assembly and disassembly operations.

45. That method of providing prospective present and branchout service connections from a multiple-conductor shielded main cable which method comprises: forming a loop at a selected location therealong, unsheathing the return bend portion of said loop including a length of its shield, clamping each end of said shield on each leg of said loop against a juxtaposed portion of the cable sheath and in electrical circuit with a grounding conductor extending therefrom, extending a plurality of shielded branchout service cables each having at least one pair of conductors lengthwise of and closely parallel to the legs of said loop, embedding in potting compound a longitudinal length of said loop legs including the connections of said grounding conductor to said main cable shield and the adjacent lengths of said branchout service cables, and enclosing said cable loop with a removable fluid-tight closure cap having one end telescoping about the adjacent end portion of said potting compound.

46. That method defined in claim 45 characterized in the step of compressing the telescoped portions of said closure and potting compound together to form a separable fluid-tight seal therebetween.

47. That method defined in claim 45 comprising the step of encircling the legs of said loop and the adjacent portions of said branchout service cables with an annular enclosure providing a form for said potting compound and having a seat snugly interfitting with the adjacent end of said closure for said cable loop.

48. That method defined in claim 45 characterized in the step of unsheathing the shield of each of said branchout service cables and connecting the same firmly to conductive grounding means in an area embedded in said potting compound with one end of said conductive grounding means exposed beyond said potting compound.

49. That method defined in claim 48 characterized in the step of separably interconnecting the exposed ends of said conductive grounding means from the shields of said main cable to either end of said cable loop and from the shields of said branchout service cables.

50. That method defined in claim 45 characterized in the step of providing means for automatically compensating for pressure conditions existing on the opposite sides of the wall of the closure for said cable loop while assembled in a fluid-tight manner relative to said potting compound.

51. That method defined in claim 50 characterized in the step of utilizing a closure for said cable loop having a readily flexible wall responsive to pressure differential between the interior and exterior of said closure shiftable to compensate therefor.

* * * * *